United States Patent [19]

Kurita et al.

[11] Patent Number: 5,509,668
[45] Date of Patent: Apr. 23, 1996

[54] MECHANICAL SEAL FOR PRESSURIZED FLUID PUMPS

[75] Inventors: Toshinori Kurita; Eiji Kojima; Tadayuki Shimowada; Fujio Sato, all of Nakashima, Japan

[73] Assignee: Toyoda Gosei Co., Ltd., Nishikasugai, Japan

[21] Appl. No.: 250,775

[22] Filed: May 27, 1994

[30] Foreign Application Priority Data

May 28, 1993 [JP] Japan .................................. 5-151543

[51] Int. Cl.$^6$ ...................................................... F16J 15/34
[52] U.S. Cl. ............................................................ 277/81 R
[58] Field of Search ................................. 277/38, 39, 40, 277/53, 81 R, 94, 96.1

[56] References Cited

U.S. PATENT DOCUMENTS

| | | | |
|---|---|---|---|
| 2,023,206 | 12/1935 | Olson | 277/81 R |
| 3,715,169 | 2/1973 | Molis | 277/81 R |
| 3,749,412 | 7/1973 | Lingley | 277/81 R |
| 4,328,973 | 5/1982 | Delbridge | 277/85 |
| 4,336,944 | 6/1982 | Blair | 277/81 R |
| 4,419,086 | 12/1983 | Condon | 277/92 |
| 4,768,790 | 9/1988 | Netzel et al. | 277/81 R |
| 5,161,804 | 11/1992 | Orlowski et al. | 277/81 R |
| 5,224,714 | 7/1993 | Kimura et al. | 277/81 R |
| 5,290,047 | 3/1994 | Duffee et al. | 277/53 |
| 5,378,000 | 1/1995 | Orlowski | 277/53 |

FOREIGN PATENT DOCUMENTS

| | | | |
|---|---|---|---|
| 1-283476 | 11/1989 | Japan | 277/81 R |
| 1652714 | 5/1991 | U.S.S.R. | 277/81 R |
| 1718733 | 3/1992 | U.S.S.R. | 277/81 R |
| 634848 | 3/1950 | United Kingdom | 277/9.5 |

*Primary Examiner*—William A. Cuchlinski, Jr.
*Assistant Examiner*—John L. Beres
*Attorney, Agent, or Firm*—Cushman, Darby & Cushman

[57] ABSTRACT

A mechanical seal for pressurized fluid pumps including rotary and non-rotating seal members that are compressed together. The rotary seal member is fixed to a drive shaft and includes a contact sealing surface. The non-rotational seal member is also positioned about the drive shaft in a manner that allows for axial but not rotational movement. When a biasing force is placed against one side of the non-rotational seal member the opposite side, the non-rotating contact sealing surface, is pressed into contact with the complimentary rotary seal member contact sealing surface thus providing a mechanical seal.

9 Claims, 4 Drawing Sheets

MECHANICAL SEAL FOR PRESSURIZED FLUID PUMPS

FIELD OF THE INVENTION

The present invention relates to a mechanical seal for pressurized fluid pumps having both rotary and stationary seal members that contact each other for sealing.

DESCRIPTION OF RELATED ART

A conventional seal structure, such as that used in pressurized fluid pumps for pumping polymer material to manufacturing equipment, employs a type of packing for sealing. As shown in FIG. 4, the packing P is formed with a W-shape in a vertical cross-section and the packing P has a concavity formed therein. The packing P may be made of rubber, or fluorocarbon polymers, such as tetrafluoroethylene, or may be comprised of other synthetic resins. The packing P is mounted around a seal member S made of super-steel. The seal member S is fixed on an outer surface of a drive shaft D. A coil spring C is installed in the concavity of the packing P in order to radially bias the packing P toward the seal member S.

Where the packing P is made of rubber or synthetic resin, such packing material will only last a short time and the sealing ability deteriorates quite quickly. This deterioration occurs where oil is adhered to the drive shaft D and gets into the seal member S. When air is present, the air and the oil react, causing deterioration of the packing P and ultimately sealing. Consequently, the conventional seal structure has a reduced sealing ability and shortened life-time.

Problems can also arise where chemicals are being pumped. For example, when isocyanate is used for forming polyurethane products and some amount leaks into the air during pumping, it will react with air and harden like a stone. If isocyanate material is supplied by the above described pressurized fluid pump, leaking isocyanate can harden and damage the packing P if it leaks toward and into the sealing area. It can also damage the drive shaft D.

SUMMARY OF THE INVENTION

The present invention has been developed to overcome the problems associated with the conventional seal described above.

An object of the present invention is to provide a mechanical seal which is not affected by oil or other seal type reactions, but rather maintains the sealing ability of the seal for a long time.

Another object of the present invention is to provide a mechanical seal which prevents injury to seal members or the drive shaft by hardened isocyanate material, when isocyanate material is used or being pumped, and produces a long life-time of sealing.

In accordance with the invention, the objects are achieved by a mechanical seal that can be effectively be used with pressurized fluid pumps. The seal comprises cooperating rotary and stationary or non-rotating seal members, a support member and one or more compressed springs to provide a bias contact between the rotary and stationary or non-rotating seal members. In some instances, additional separate sealing members, preferably in the form of O-rings, can also be employed to improve long term results. A flange member forms part of a pressurized fluid pump housing. A drive shaft is rotatably supported relative to the pump housing through use of bearings. The rotary seal member is metal and preferably made of steel and fixed on the drive shaft. The stationary or non-rotating seal member is also made of metal, preferably made of steel, and is mounted adjacent the rotary seal member. The member supporting the springs, and which can overlay at least part of the seal member, is made of metal, such as steel, and is fixed to the pump housing. The spring force is developed by being mounted under compression between the stationary or non-rotating seal member and the supporting member. The resulting force urges the stationary or non-rotating seal member and its contact surface axially into contact with the contact surface of the rotary seal member creating a mechanical seal therebetween due to the biasing force from the spring. Thus, the stationary or non-rotating seal member is also an axially movable seal member so as to utilize the axial force provided by compressed springs to move it toward the rotary seal member.

Other objects, features and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

Figure 1:
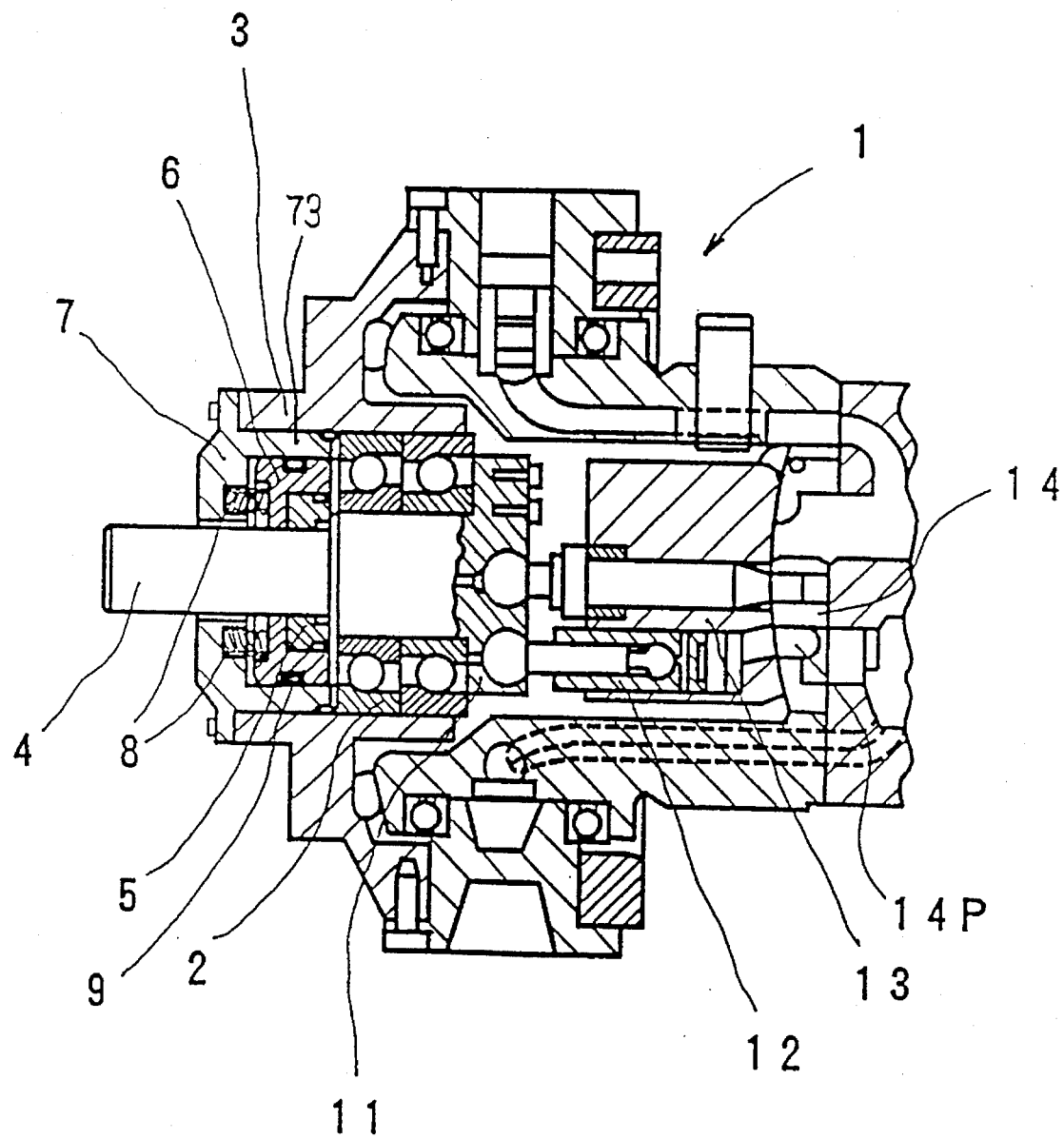
FIG. 1 is a vertical cross-sectional view showing a pressurized fluid pump according to a first embodiment of the present invention.
Figure 2:
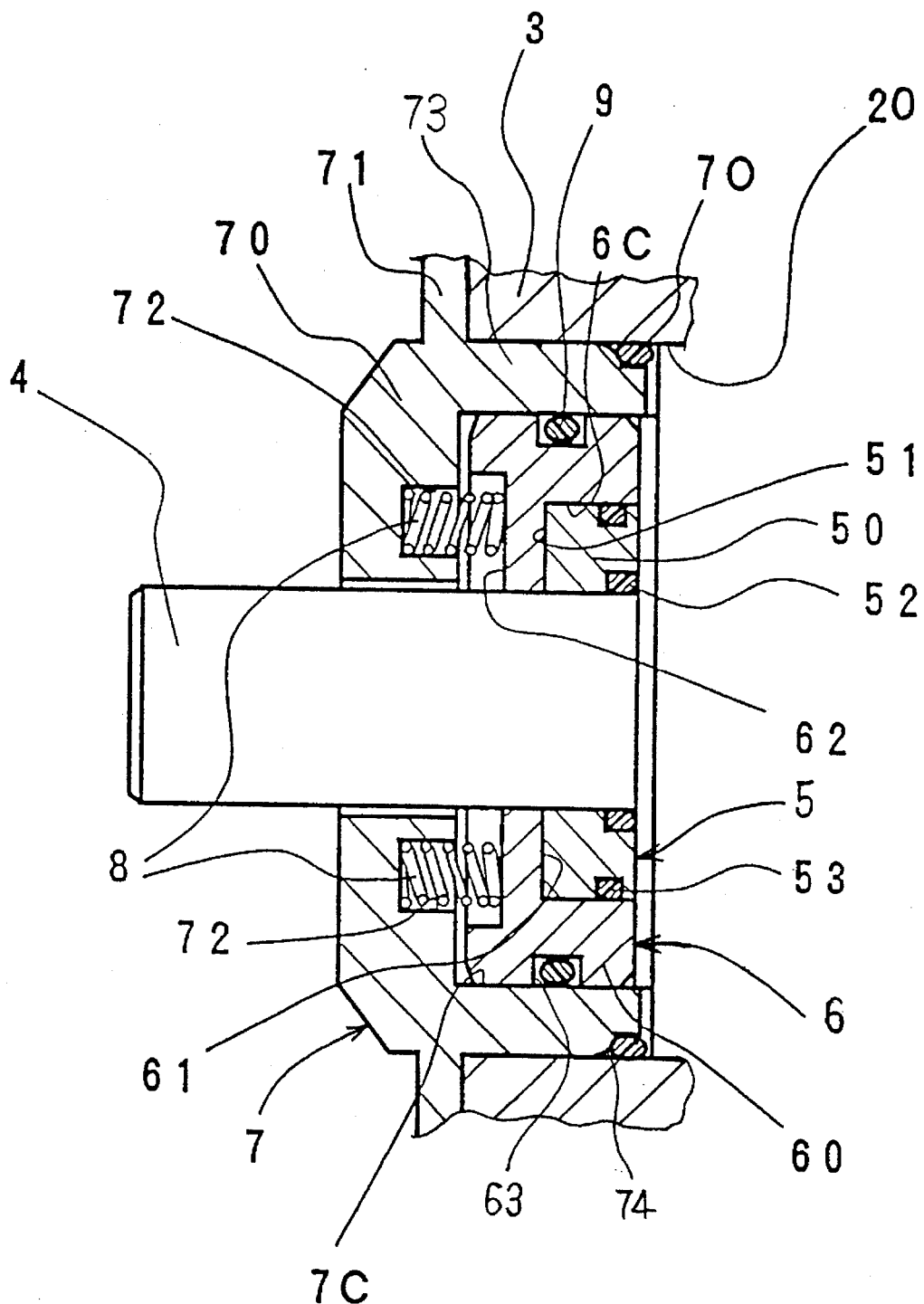
FIG. 2 is an enlarged, partial vertical cross-sectional view of a mechanical seal of the first embodiment in FIG. 1.

As shown in FIG. 1, a mechanical seal of a first embodiment is used adjacent the bearing portion of a pressurized fluid pump 1. Such a pump could be used, as noted previously, for delivering polyurethane materials to manufacturing equipment. As shown in FIGS. 1 and 2, the mechanical seal is made up of a rotary seal member 5 a non-rotating or stationary, axially movable, seal member 6, a support member or assembly 7 and spring members 8. As discussed below, one or more sealing members can also be used to seal between the parts of the mechanical seal. A detailed description of each component is given below.

A flange member 3 is formed or provided, for example, at the left end portion of the housing for the pressurized fluid pump 1. A drive shaft 4 is rotatably supported by bearings 2 within the pump housing, and specifically within the bore 20 provided within flange member 3.

The rotary seal member 5 comprises an annular member 50 made of steel, having a central hole through which the drive shaft 4 extends. Rotary seal member 5 is fixed to drive shaft 4 by any convenient joint or mechanism such as, for example, a spline (not shown). The rotary seal member 5 also has an inner annular groove positioned, for example, at the right end portion on the inner wall, and an outer annular groove on an outer wall. An O-ring 52 is inserted in the inner annular groove and an O-ring 53 is inserted in the outer annular groove.

The non-rotating or stationary seal member 6 is an annular member 60 made of steel that includes a concavity 6C. Thus, seal member 6 has a substantially U-shaped vertical cross-sectional shape. Such a shape helps define concavity 6C but what is required is the presence of the stationary and rotating contact surfaces will be discussed more fully below. Stationary seal member 6 can, however, move in an axial direction along the drive shaft 4. The bottom or interior portion of the concavity 6C has a contact surface 61 which is contacted by a complementary contact surface 51 of the-rotary seal member 5. The rotary seal member 5 is sized so that it fits into concavity 6C in a manner that permits contact surface 51 to lie against contact surface 61. As shown in FIG. 2, the contact surface 51 is located at the left end of the annular flange member 50, in an axial direction. The stationary seal member 6 also has an annular groove 63 on its outer surface in which O-ring sealing member 9 is inserted so as to be positioned between and, therefore, seals between stationary seal member 6 and supporting member 7. Also, the stationary seal member 6 can have a concavity 62 at the opposite side from contact surface 61 in order to mount spring members 8.

Support member 7 comprises an annular member 70 also made of steel, and is fixed to the flange member 3 by an annular flange portion 71 and bolts, screws or other convenient approach (not shown). Support member 7 also has a cylindrical body 73, with an internal concavity 7C, that extends axially inwardly so as to overlap at least a portion of stationary seal member 6 and is positioned between an inner wall 20 of flange member 3 and the exterior stationary seal member 6. It is, therefore, U-shaped in its vertical cross-section. Therefore, the non-rotating or stationary seal member 6 is supported against flange member 3 by support member 7. A plurality of holes or concavities 72 are provided on the interior portion of concavity 7C in order to receive the spring members 8 therein. A plurality of spring members 8 are mounted in a compressed condition between the stationary seal member 6 and support member 7, specifically within holes 72. Seal member 6 can move axially and spring members 8 force contact surface 61 toward contact surface 51 thereby establishing the desired mechanical seal because of the biasing force provided by compressed springs 8. Support member 7 also has an annular groove 74 provided on the outer surface of the interior end of cylindrical body 73, and an O-ring 70 is inserted into annular groove 74. Therefore, the O-ring 70 is installed between support member 7 and flange member 3.

Spring members 8 are preferably coil springs, and are mounted between the concavities 72 and the concavity 62. Because spring members 8 are compressed between members 6 and 7, a certain biasing force is applied to the left end of the seal member 6, thereby forcing seal member 6 to move to the right in an axial direction in FIG. 2.

In accordance with the above-mentioned mechanical seal, as spring members 8 force seal member 6 into contact with the rotary seal member 5 by the biasing force, the contact surface 51 of the rotary seal member 5 is pressed by the contact surface 61 of the seal member 6. Due to the presence of and the location of O-rings 9, 52, 53 and 70, the contact surfaces 51, 61 are sealed from pump lubricating oil, the isocyanate material which is supplied by the pressurized fluid pump 1, and air.

The rotary seal member 5 and the non-rotating or stationary seal member 6 are preferably made of metal, such as, for example, steel. However, other metals can be used, for example, super-steel, stainless steel, chrome steel, carbon steel, aluminum alloy and copper alloy. Since contact surfaces 51 and 61 are pressed against one another by spring members 8, desired sealing results are obtained. Also, the resulting mechanical seal will not react with oil. Because of this sealing, oil which might be adhered to or get on the drive shaft 4 or bearings 2, does not work into the rotating seal created by surfaces 51, 61 nor does it react with the seal members such as is the case where conventional packing is used as a seal member. The mechanical seal of the first embodiment maintains its ability to seal for a long time. The mechanical seal also prevents injury to the drive shaft or the seal members by hardened isocyanate material.

Because of the surface seal provided by contact surfaces 51 and 61, it is also possible to eliminate O-ring 53.

The pressurized fluid pump 1, shown in FIG. 1, is a variable capacity type angled piston pump, also known as a bent axis type axial piston. It has a fixing plate 11 which is integrally formed with the drive shaft 4, a plurality of pistons and piston-rods 12, a cylinder-block 13, which allows the pistons and piston-rods 12 to reciprocate in it, and a port-plate 14 which includes at least one port 14P. When the pistons and piston-rods 12 reciprocate in the cylinder-block 13, the isocyanate material for producing polyurethane is supplied through the port 14P.

Figure 3:
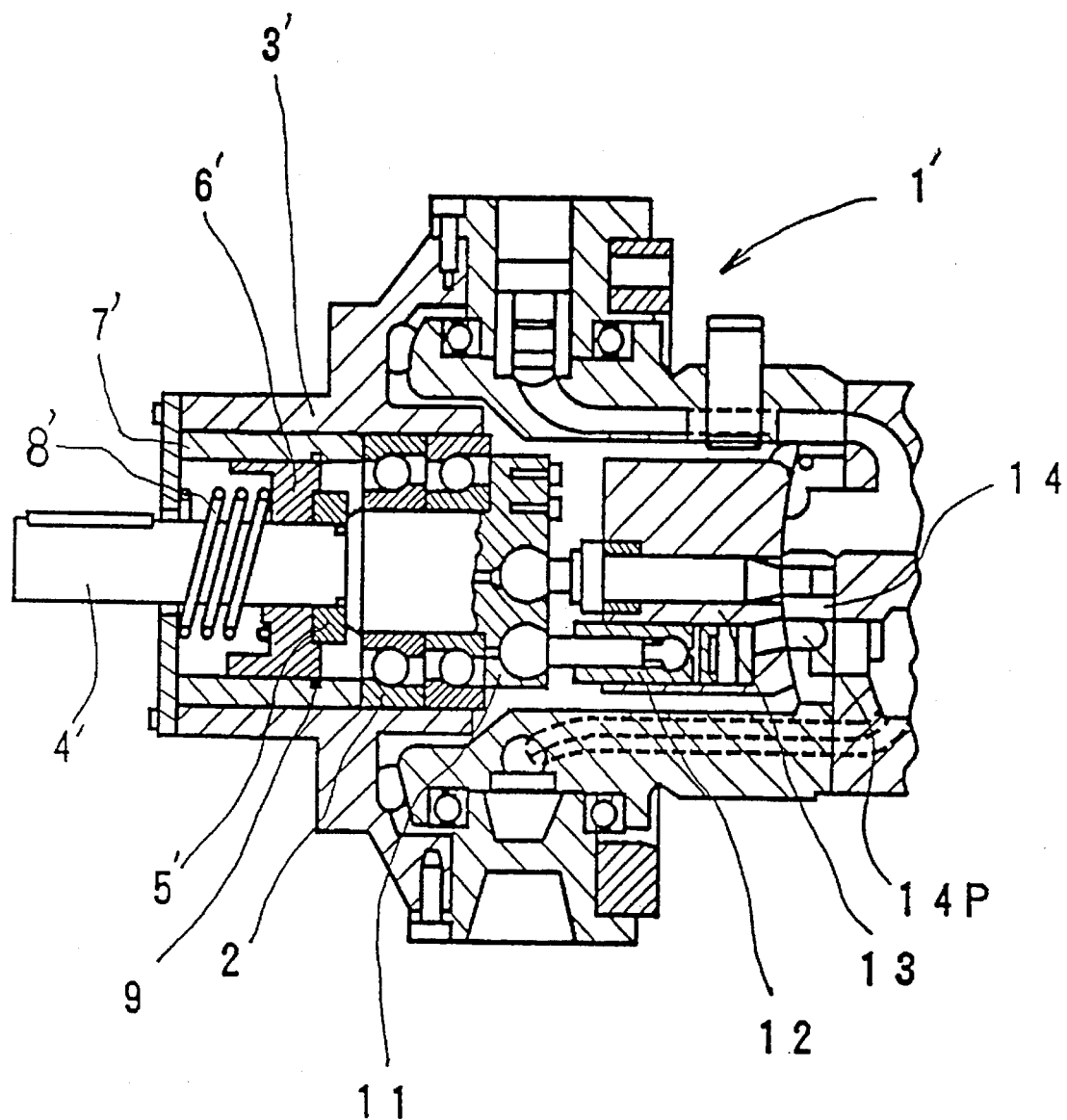
FIG. 3 is a vertical cross-sectional view showing a pressurized fluid pump according to a second embodiment of the present invention.
Figure 4:
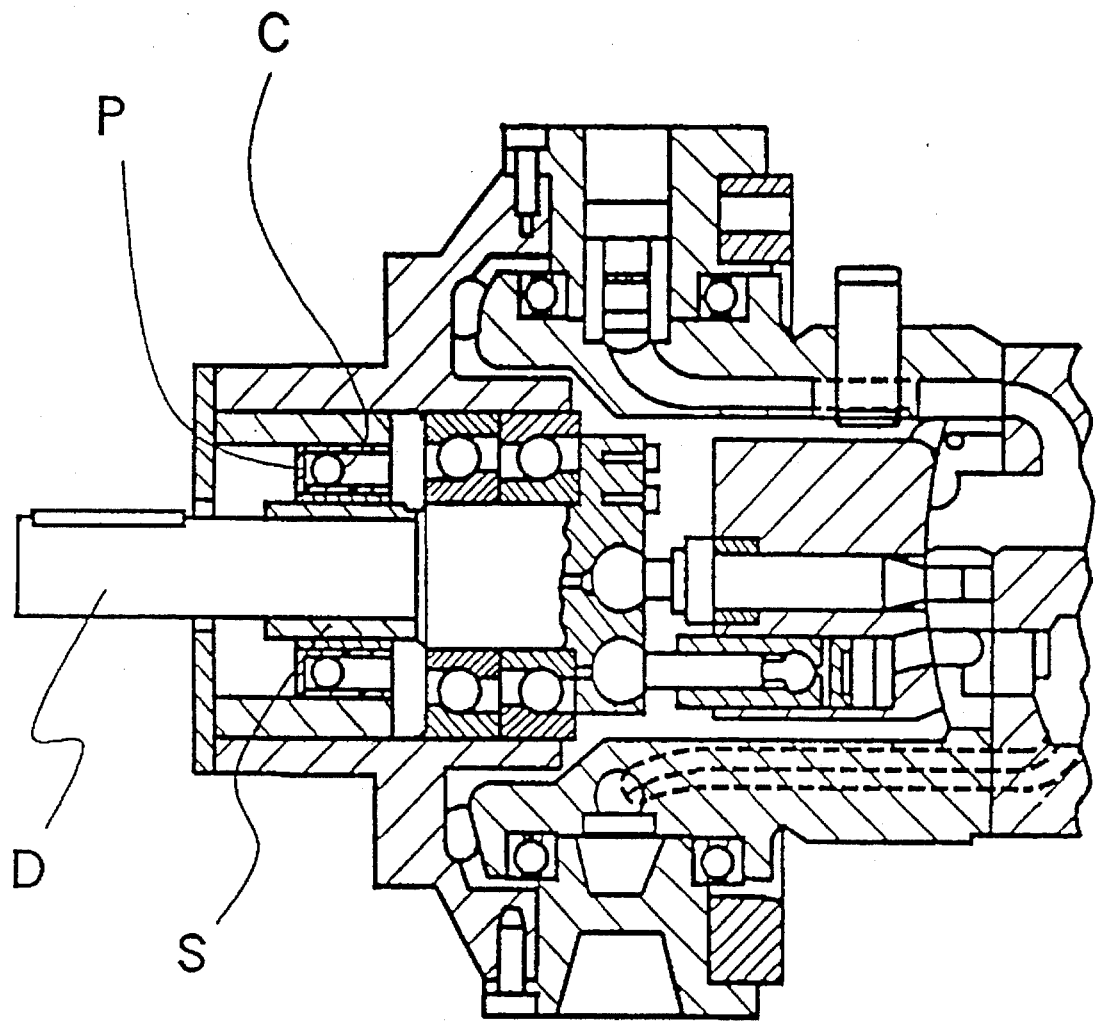
FIG. 4 is a vertical cross-sectional view showing a conventional, prior art, pressurized fluid pump.

FIG. 3 shows a second embodiment of the present invention. Here, the pressurized fluid pump 1' uses only one spring member 8' which mounts around a drive shaft 4'. Spring member 8' continues to provide a biasing force, for example, in an axial direction, thereby forcing the stationary seal member 6' into contact with the rotary seal member 5'. However, the shape of each component such as a supporting member 7' is little different due to the modification of spring member 8'. The remaining structure of the mechanical seal of the second embodiment can have substantially the same structure as the first embodiment. Therefore, the same function and result are obtained in the second embodiment as in the first embodiment.

The mechanical seal of this invention can be adapted to other type pumps, for example, swash plate type axial piston pumps, also known as in-line piston pumps, radial piston type pumps, rotary type pumps such as vane pumps or gear pumps.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mechanical seal for pressurized fluid pumps comprising:

a pump housing in which a drive shaft having an axis is rotatably mounted;

a rotary seal member extending about and fixed to said drive shaft and having a rotary contact surface, and an outer peripheral surface extending substantially parallel to said axis;

an axially movable seal member extending about said drive shaft and having a stationary contact surface facing and in contact with said rotary contact surface, said axially movable seal member including an outer flange extending axially away from said stationary contact surface, thereby defining a cylindrical cavity surrounding said stationary contact surface, said rotary seal member fitting within said cylindrical cavity; and a spring member compressed between said housing and a side of said axially movable seal member opposite said stationary contact surface to provide a biasing force against said axially movable seal member toward said rotary seal member, wherein said axially extending outer flange overlies substantially the full extent of said outer peripheral surface of said rotary seal member.

2. A mechanical seal as in claim 1 wherein said housing includes a body having a bore in which said drive shaft is mounted together with said rotary and axially movable seal members, and a flange member extending about said drive shaft and connected to said body, said flange member having an axially extending rim that interfits within said bore and overlies said axially movable seal member.

3. A mechanical seal as in claim 2 further including an additional sealing member located between said axially movable seal member and said overlying rim.

4. A mechanical seal as in claim 1 further including sealing members positioned between an outer peripheral surface of said rotary seal member and an inner surface of said cylindrical cavity which overlies said outer peripheral surface.

5. A mechanical seal as in claim 4 wherein said sealing members comprise O-rings.

6. A mechanical seal as in claim 1 further including a plurality of spring members for biasing said axially movable seal member.

7. A mechanical seal as in claim 1 wherein said spring member extends around said drive shaft.

8. A mechanical seal as in claim 1 wherein said rotary seal member and said axially movable seal member are comprised of metal.

9. A mechanical seal as in claim 8 wherein said metal is steel.

\* \* \* \* \*